US012782678B2

(12) United States Patent
Alisafaee

(10) Patent No.: US 12,782,678 B2
(45) Date of Patent: Nov. 3, 2026

(54) ZERNIKE DOUBLE-METALENS COOKE TRIPLET

(71) Applicant: Corlens Inc., Fort Wayne, IN (US)

(72) Inventor: Hossein Alisafaee, Terre Haute, IN (US)

(73) Assignee: Corlens Inc., Fort Wayne, IN (US)

( * ) Notice: Subject to any disclaimer, the term of this patent is extended or adjusted under 35 U.S.C. 154(b) by 235 days.

(21) Appl. No.: 18/608,641

(22) Filed: Mar. 18, 2024

(65) Prior Publication Data

US 2025/0291153 A1 Sep. 18, 2025

(51) Int. Cl.

| | |
|---|---|
| ***G02B 9/14*** | (2006.01) |
| ***B82Y 20/00*** | (2011.01) |
| ***G02B 1/00*** | (2006.01) |
| ***G02B 13/14*** | (2006.01) |
| ***G02B 27/00*** | (2006.01) |

(52) U.S. Cl.

CPC ................ *G02B 9/14* (2013.01); *B82Y 20/00* (2013.01); *G02B 1/002* (2013.01); *G02B 13/14* (2013.01); *G02B 27/0025* (2013.01); *G02B 2207/101* (2013.01)

(58) Field of Classification Search

CPC .......... G02B 9/14; G02B 1/002; G02B 13/14; G02B 27/0025; G02B 2207/10; G02B 1/00; G02B 27/00; G02B 27/50; G02B 2207/101; G02B 5/1809; G02B 5/1876; B82Y 20/00; B82Y 40/00; F21V 5/004; F21V 5/045; F21V 5/046; F21V 5/10; F21K 9/64; H04N 13/25

USPC .......................................................... 359/785

See application file for complete search history.

(56) References Cited

U.S. PATENT DOCUMENTS

| | | | |
|---|---|---|---|
| 2,720,816 A | 10/1955 | Sandback | |
| 10,338,275 B1 * | 7/2019 | Acosta ............... | H04N 23/6812 |
| 10,408,416 B2 | 9/2019 | Khorasaninejad et al. | |
| 2020/0096672 A1 * | 3/2020 | Yu ........................ | G02B 5/1857 |
| 2020/0285067 A1 * | 9/2020 | Arbabi ................. | G02B 5/1814 |
| 2022/0357595 A1 * | 11/2022 | Guillot ..................... | G02C 7/06 |

FOREIGN PATENT DOCUMENTS

CN 114690387 A * 7/2022 ..... G02B 15/143105

OTHER PUBLICATIONS

Handbook of Optical Systems optimization (Year: 2007).*
English translation of CN114690387(Jul. 1, 2022) (Year: 2022).*

* cited by examiner

*Primary Examiner* — William R Alexander
*Assistant Examiner* — Kuei-Jen L Edenfield
(74) *Attorney, Agent, or Firm* — ASHURST PERKINS COIE US LLP

(57) ABSTRACT

An imaging lens system is disclosed comprised of a first optical element, a second optical element, and a third optical element. The first optical element is a conventional lens, while the second and third optical elements are metalenses. Each metalens produces a phase profile according to Zernike Polynomials. An adaptive phase wrapping may be included to enable large area metalenses. The disclosed system is distinguished from the prior art for its practicality. The best mode of the system follows with optical powers for the three elements to be positive, negative and positive, respectively.

20 Claims, 4 Drawing Sheets

ZERNIKE DOUBLE-METALENS COOKE TRIPLET

TECHNICAL FIELD

The present disclosure relates to the field of optical imaging. More specifically the disclosure is related to the aberration correction and imaging using metalenses in a Cooke Triplet lens for long-wavelength infrared imaging systems.

BACKGROUND OF THE INVENTION

The Cooke triplet is a photographic lens designed and patented (patent number GB 22,607) in 1893 by Dennis Taylor who was employed as chief engineer by T. Cooke & Sons of York. The Cooke triplet is a fundamental architecture for imaging lenses, which provides aberration correction using three lens elements in its most basic form. Over the years, the three elements were modified to improve the image quality. The modifications include splitting elements to gain extra degrees of freedom to correct for different forms of aberrations using surface curvatures and alternative materials, leading to Tessar and Planar (Xenotar) designs. Nowadays, the Cooke triplets may even contain more than 20 elements to obtain a high-quality image.

The increased number of elements in an imaging lens is favorable from an image quality standpoint, however the challenges and side effects that follow include increased cost, size, and weight. These side effects of the increased number of elements are undesirable for certain applications such as for aerial and space applications where the total weight of the lens is of critical importance.

Certain applications in aerial and space imaging require the use of long-wavelength infrared (LWIR) light, where there is a limited range of materials available for making lenses and the cost of the current materials, such as Germanium, is expensive.

Therefore, what is desirable is a new imaging solution that achieves less size, weight, and cost of the optical system.

Metalenses have been introduced as a potential remedy for imaging applications to reduce the size and weight of optical systems. The metalenses are usually flat surfaces that can be designed to produce a phase profile that mimics the function of a converging lens with positive optical power which leads to image formation. The phase profile in metalenses is usually produced by many subwavelength phase elements with different geometrical shapes at their cross-sections. Examples of the phase elements could include columns of material with round or rectangular cross-sections.

Regular lenses produce a color effect called chromatic dispersion in where different wavelengths of light come to focal point at locations slightly different from each other, resulting in a degraded overall image quality since imaging at the focal plane for a particular color comes with unfocused or blurry image of other colors. Usually for a positive, converging lens, the longer wavelengths focus at longer distances from the lens and vice versa. That means, for example, the blue light focuses closer to the lens, than green, and green focuses closer than red. The distance from the blue to red focal points is called primary color. The metalenses produce an abnormal chromatic dispersion where the red color comes to focus closer to the lens than the blue color, with a large primary color compared to the regular lenses. Efforts have been disclosed to correct for the chromatic dispersion in metalenses to obtain focal points that are much less sensitive to the colors of light. This type of metalenses is called achromatic metalenses, introduced with pioneering works such as by KHORASANINEJAD in U.S. Pat. No. 10,408,416 B2.

There are several key limitations hindering the practicality of achromatic metalenses for imaging applications such as polarization sensitivity, small achromatic range, noise, and low efficiency. The diameter of such lenses is also limited to small sizes. To date, the available solutions based on metalens have only offered limited success without much industrial integration in actual high quality imaging systems.

Therefore, what is desirable is a new architecture for imaging systems based on metalenses that achieves less size, weight, and cost of the optical system and ensures a practical solution.

OBJECT AND SUMMARY OF THE INVENTION

The various embodiments of the present disclosure may, but do not necessarily, achieve one or more of the following goals: a primary object of the present disclosure is to provide an optical design based on Zernike double-metalens for a high quality Cooke triplet lens that will overcome the shortcomings of the prior art; another object is to provide a method for the design of low cost, high image quality, compact imaging lenses that contain at least two metalenses. These and other advantages may be realized by reference to the remaining portions of the specification.

The present disclosure is a new architecture for the conventional Cooke triplet lens. One embodiment of the disclosure comprises at least a conventional lens (L1) at the front of the optical system followed by two metalens elements (ML1 and ML2). The design of ML1 is dependent on L1, and the design of ML2 is dependent on ML1. ML1 and ML2 provide phase profiles based on Zernike polynomials to improve the aberrations and enhance the image quality.

The above description sets forth, rather broadly, a summary of one embodiment of the present disclosure so that the detailed description that follows may be better understood and contributions of the present disclosure to the art may be better appreciated. Some of the embodiments of the present disclosure may not include all of the features or characteristics listed in the above summary. There are, of course, additional features of the disclosure that will be described below and will form the subject matter of the claims. In this respect, before explaining at least one embodiment of the disclosure in detail, it is to be understood that the disclosure is not limited in its application to the details of the construction and to the arrangement of the components set forth in the following description or as illustrated in the drawings. The disclosure is capable of other embodiments and of being practiced and carried out in various ways. Also, it is to be understood that the phraseology and terminology employed herein are for the purpose of description and should not be regarded as limiting.

BRIEF DESCRIPTION OF DRAWINGS

Various objects, features and attendant advantages of the present invention will become fully appreciated as the same becomes better understood when considered in conjunction with the accompanying drawings, in which reference characters designate the same or similar parts throughout the several views, and wherein.

DETAILED DESCRIPTION OF THE INVENTION

Figure 1:
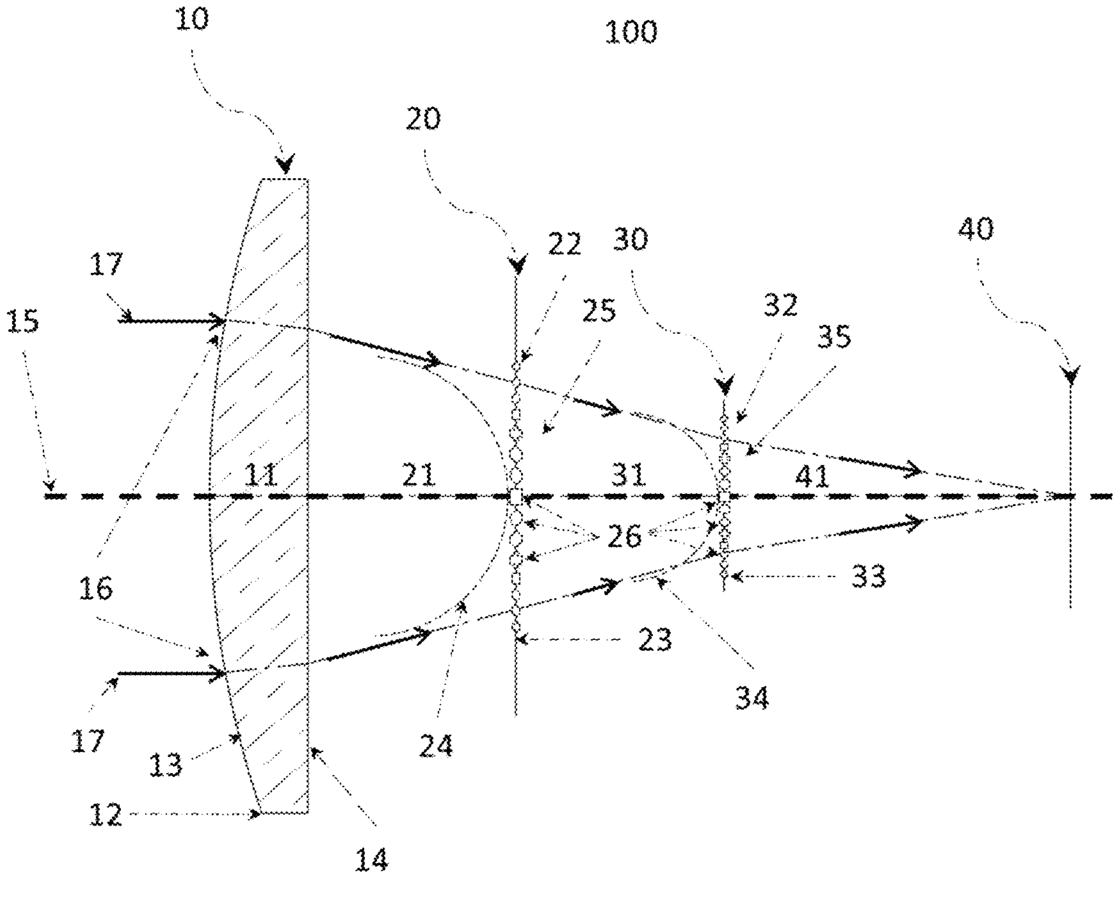
FIG. 1 is substantially a schematic of the disclosed Zernike Double-Metalens Cooke triplet lens with three optical elements and an unwrapped phase for each metalens.

In the following detailed description of embodiments of the present disclosure, reference is made to the accompanying drawings, which form a part of this application. The drawings show, by way of illustration, specific embodiments in which the disclosure may be practiced. It is to be understood that other embodiments may be utilized, and structural changes may be made without departing from the scope of the present disclosure. In describing the drawings, similar reference characters denote similar elements throughout several figures.

FIG. 1 shows one embodiment of the present disclosure. In summary, the figure substantially shows a schematic of the Zernike Double-Metalens Cooke triplet lens with three optical elements 10, 20 and 30. The front lens 10 is a conventional lens element that collects light. The second element 20 is substantially a metalens with a phase profile designed based on Zernike polynomials. The third element 30 is substantially another metalens designed also based on Zernike polynomials. For thermal imaging applications, the front lens 10 could be made from Ge, Si, or other infrared materials well-known to a person having ordinary skill in the art.

Adding more details, FIG. 1 shows an imaging lens system 100 comprised of a first optical element 10 as a regular or conventional lens, also called a front lens in the present disclosure, which typically is comprised of a thickness of a first optical material 11 enclosed by a first diameter 12, a first refractive surface 13, and a second refractive surface 14. The first optical element defines an axis of radial symmetry 15 that passes through center of the first optical element 10 and center of both the first refractive surface 13 and the second refractive surface 14. The first optical element 10 also defines an opening 16 to receive a light 17 incoming to the imaging lens system 100, and then redirects the light 17 along the axis 15 using refraction.

Figure 2:
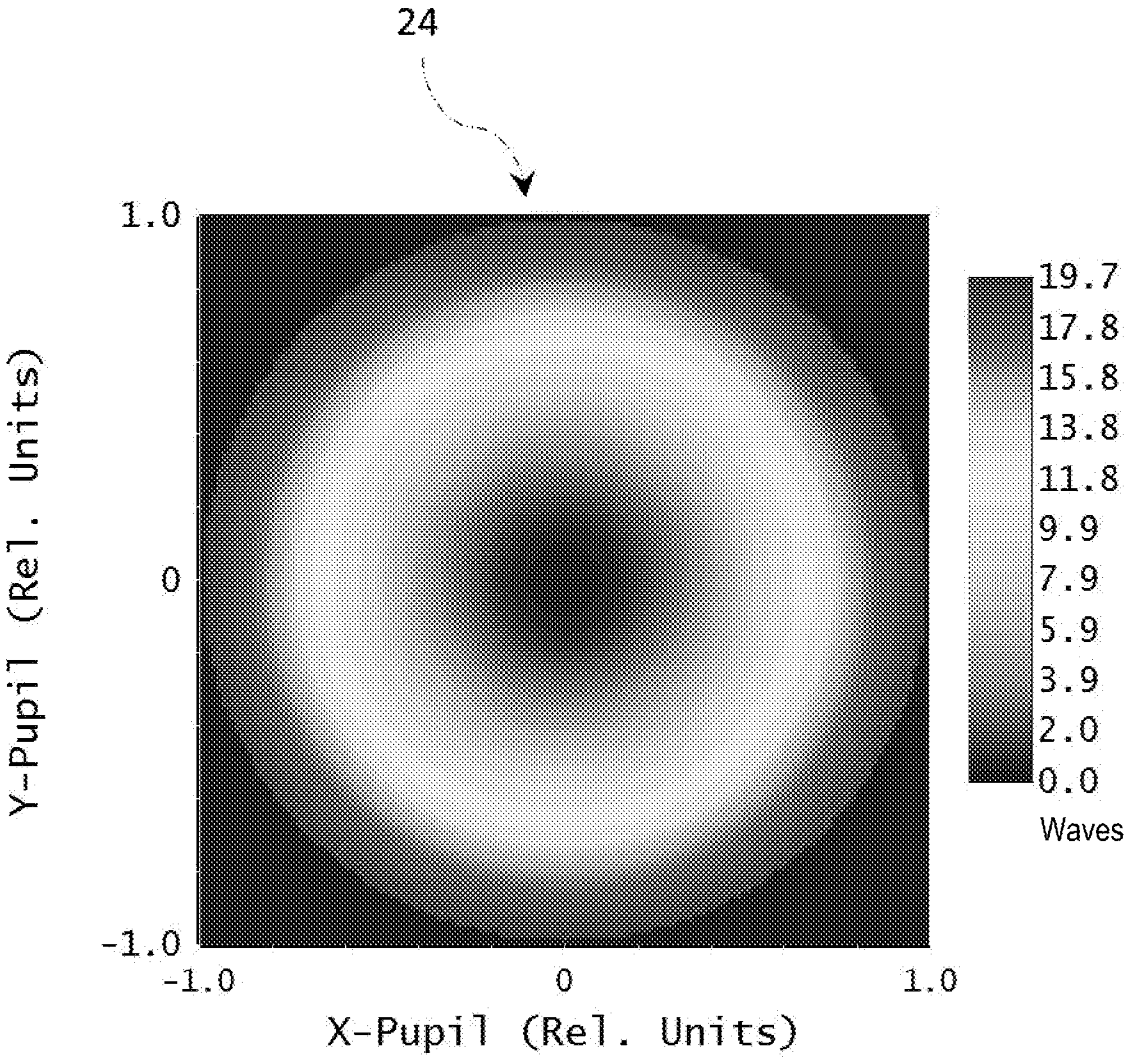
FIG. 2 is substantially a phase profile obtained based on Zernike polynomials for one of the metalens elements.

The front lens is followed by a second optical element 20 centered on the axis 15, placed at a first distance 21 to the first optical element 10 to receive the light 17 redirected by said first optical element 10. The second optical element 20 is a metalens 22 with a diameter 23 and a phase profile 24 (FIG. 2). A phase profile usually defines the optical function of a metalens as a phase shift imparted to light at a point on the metalens. For symmetric metalenses, the phase profile, q, is also symmetric along the axis and can be described as a function of radial position from the axis, r, and the wavelength, λ:

$$\phi(r, \lambda) = \frac{2\pi}{\lambda}\left(\sqrt{r^2 + f^2} - f\right),$$

where f is the desired focal length of the metalens. However, in the current disclosure, the metalens 22 is not the sole element in the optical system and therefore its design should not follow the simple equation stated above to avoid noise and bad image quality. The phase profile 24 of metalens 22 is dependent on optical properties of the first optical element 10 and must be described using Zernike polynomials. One method to describe the phase profile using Zernike polynomials is using the Zernike Standard phase function defined by the Zernike Standard coefficients. The phase terms add optical path to the light as it crosses the surface. The phase profile 24 is given by $$\phi_A = \sum_{i=1}^{N} 2\pi A_i Z_i(r, \theta),$$

where N is the number of Zernike coefficients in the series, $A_i$ are the coefficient of the ith Zernike Standard polynomial, r is the normalized radial ray coordinate, and θ is the angular coordinate. The first thirty-seven terms of the Zernike Standard Polynomials are listed below.

| | |
|---|---|
| Z 1 | 1 |
| Z 2 | 4^(½) (r) * COS (θ) |
| Z 3 | 4^(½) (r) * SIN (θ) |
| Z 4 | 3^(½) (2r^2 − 1) |
| Z 5 | 6^(½) (r^2) * SIN (2θ) |
| Z 6 | 6^(½) (r^2) * COS (2θ) |
| Z 7 | 8^(½) (3r^3 − 2r) * SIN (θ) |
| Z 8 | 8^(½) (3r^3 − 2r) * COS (θ) |
| Z 9 | 8^(½) (r^3) * SIN (3θ) |
| Z 10 | 8^(½) (r^3) * COS (3θ) |
| Z 11 | 5^(½) (6r^4 − 6r^2 + 1) |
| Z 12 | 10^(½) (4r^4 − 3r^2) * COS (2θ) |
| Z 13 | 10^(½) (4r^4 − 3r^2) * SIN (2θ) |
| Z 14 | 10^(½) (r^4) * COS (4θ) |
| Z 15 | 10^(½) (r^4) * SIN (4θ) |
| Z 16 | 12^(½) (10r^5 − 12r^3 + 3r) * COS (θ) |
| Z 17 | 12^(½) (10r^5 − 12r^3 + 3r) * SIN (θ) |
| Z 18 | 12^(½) (5r^5 − 4r^3) * COS (3θ) |
| Z 19 | 12^(½) (5r^5 − 4r^3) * SIN (3θ) |
| Z 20 | 12^(½) (r^5) * COS (5θ) |
| Z 21 | 12^(½) (r^5) * SIN (5θ) |
| Z 22 | 7^(½) (20r^6 − 30r^4 + 12r^2 − 1) |
| Z 23 | 14^(½) (15r^6 − 20r^4 + 6r^2) * SIN (2θ) |
| Z 24 | 14^(½) (15r^6 − 20r^4 + 6r^2) * COS (2θ) |
| Z 25 | 14^(½) (6r^6 − 5r^4) * SIN (4θ) |
| Z 26 | 14^(½) (6r^6 − 5r^4) * COS (4θ) |
| Z 27 | 14^(½) (r^6) * SIN (6θ) |
| Z 28 | 14^(½) (r^6) * COS (6θ) |
| Z 29 | 16^(½) (35r^7 − 60r^5 + 30r^3 − 4r) * SIN (θ) |
| Z 30 | 16^(½) (35r^7 − 60r^5 + 30r^3 − 4r) * COS (θ) |
| Z 31 | 16^(½) (21r^7 − 30r^5 + 10r^3) * SIN (3θ) |
| Z 32 | 16^(½) (21r^7 − 30r^5 + 10r^3) * COS (3θ) |
| Z 33 | 16^(½) (7r^7 − 6r^5) * SIN (5θ) |
| Z 34 | 16^(½) (7r^7 − 6r^5) * COS (5θ) |
| Z 35 | 16^(½) (r^7) * SIN (7θ) |
| Z 36 | 16^(½) (r^7) * COS (7θ) |
| Z 37 | 9^(½) (70r^8 − 140r^6 + 90r^4 − 20r^2 + 1) |

Therefore, to obtain the phase profile 24 of the metalens 22 for the current disclosure, the $A_i$ coefficients must be determined.

Once the phase profile 24 is obtained, the metalens 22 can produce and impart a phase shift to light according to its phase profile 24 using a plurality of various phase elements 25 (FIG. 3), which is well-known in the art. The phase elements 25 are subwavelength structures such as columns with cross-sections 26 such as round or rectangular. The subwavelength columns of the phase elements are usually made with an optical material based on the wavelength of interest. For example, for thermal imaging, such subwavelength phase elements could be pillars of silicon with round cross-sections of different diameters to produce particular phase shifts. The height of the pillars along the axis 15 could be in the range of 1 to 10 microns, and their diameters also could range from 200 nm to 20000 nm. Determining the plurality of the subwavelength phase elements to fit the desired phase profile for metalenses is known in art (FIG. 3), which is done usually with computational methods available through commercial software such as COMSOL or Lumerical. Other materials such as Germanium could be used for metalens fabrication. The fabrication method of such structures is known in literature.

To complete the Cooke Triplet architecture, a third optical element 30 centered on the axis 15 is placed at a distance 31 to the second optical element 20. The third optical element 30 is a metalens 32 with a diameter 33 and a different phase profile 34, $\phi_B$, with $$\phi_B = \sum_{i=1}^{N} 2\pi B_i Z_i(r, \theta),$$

where, similarly to $\phi_A$, $B_i$ are the coefficients of the ith Zernike Standard polynomial. The phase profile 34 is dependent on optical properties of the first optical element 10 and the second optical element 20. Therefore, to define the phase profile 34 of the metalens 32 for the current disclosure, the $B_i$ coefficients must also be determined.

The imaging lens system 100 forms an image 40 using the light 17 incoming to said opening 16 at a distance 41 from the third optical element 30. The imaging lens system 100 provides an effective focal length from collective interactions of the light 17 with the first optical element 10, the second optical element 20, and the third optical element 30.

To determine the $A_i$ and $B_i$ coefficients, a computational optimization algorithm such as Damped Least Squares (DLS) can be used based on the target effective focal length with the intent to obtain a high-quality imaging system. Therefore, the DLS optimization merit function must include the desired effective focal length and the image quality terms, and then it could determine the $A_i$ and $B_i$ coefficients from which the phase profiles 24 and 34 are defined.

FIG. 2 shows an example phase profile 24 for metalens 22 with a diameter of about one inch. The phase profile 24 starts with a zero on the axis 15 at the center and increases to 19.7 waves at the maximum distance from the axis 15. In the graph, each wave is 2 pi. Therefore, an issue would arise which is the challenge to generate such large phase shifts as the metalens gets bigger in diameter. One potential solution is to wrap the phase at each 2 pi back to zero and keep wrapping the phase all the way to the maximum distance from the center. This is what typically done in the prior art. However, at large diameters, the width of 2 pi phase wrappings gets smaller in space since the phase profile gets very steep, which means at some far distance from the center the 2 pi wrapping would force the placement of only one or two phase elements in a wrap which results in added noise and degrades the final image significantly.

Figure 4:
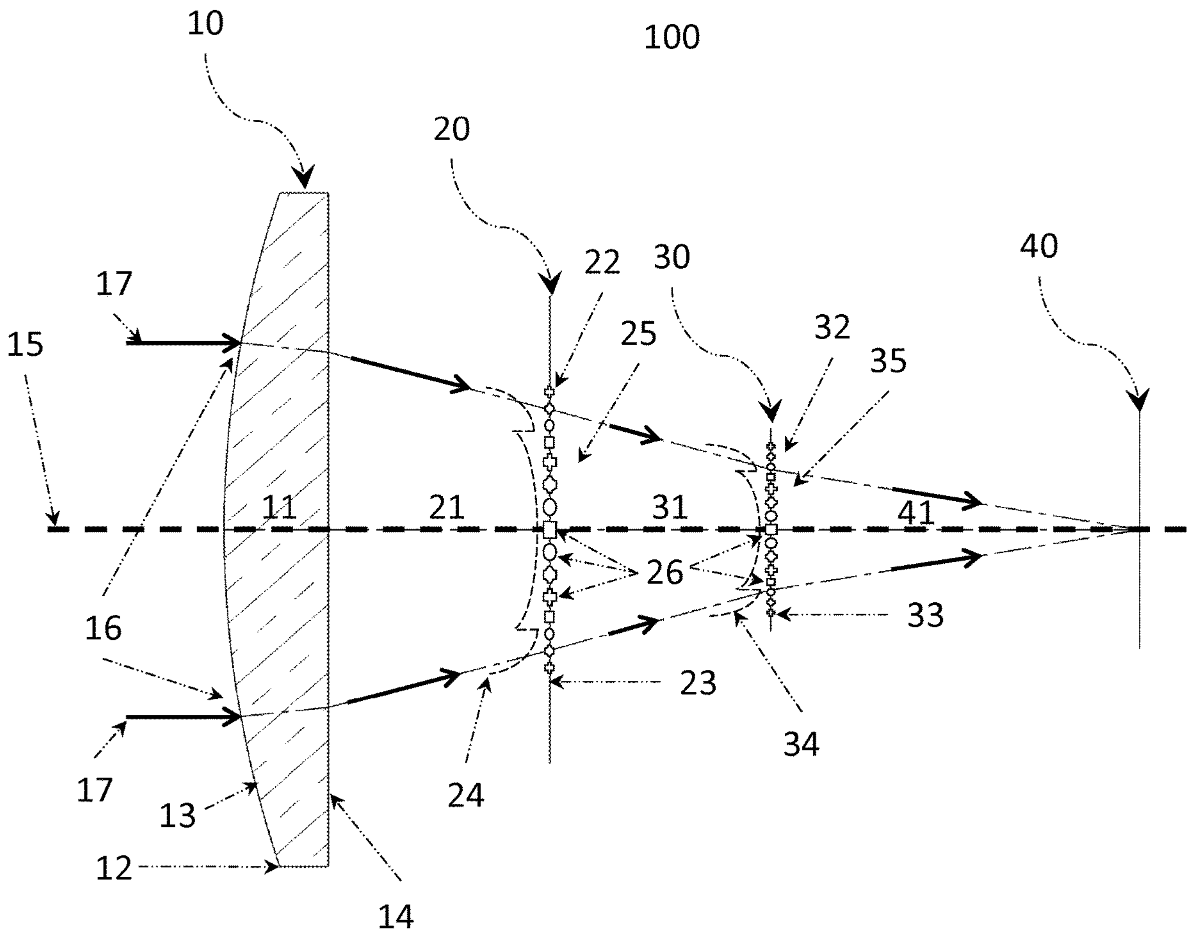
FIG. 4 is substantially a schematic of the disclosed Zernike Double-Metalens Cooke triplet lens with three optical elements and adaptive phase wrapping for each metalens.

The present disclosure contains a method to improve this issue. The phase profile which is usually a curved profile, rather than a linear profile, is sampled (or produced) by a number of phase elements across its length. Therefore, a curved phase profile cannot be correctly sampled by only two phase elements. Therefore, the current disclosure proposes a minimum of three phase elements in each phase wrapping step. Therefore, the phase profile may be "adapted" to ensure this minimum number of phase elements is provided in every phase wrapping. In the current disclosure, this method will be called "adaptive phase wrapping", as shown in FIG. 4.

In the imaging lens system 100, the first phase profile 24 may be optimized to enable a diverging property for the light which is equivalent to a negative lens with negative effective focal length or a negative optical power. Following the negative power metalens, the second phase profile 34 of metalens 32 may be optimized for a converging property of light equivalent to a positive optical power in a positive lens. This architecture follows the order of lenses as in the original Cooke Triplet to be +−+.

A huge benefit of the architecture in the present disclosure is that due to the opposite powers of metalenses, their opposite chromatic aberrations can also add, reaching close to zero and effectively cancel each other, leading to a high-quality image formation. There may be some residual color left due to differences in the absolute optical power of each metalens, and that residual chromatic aberration can be cancelled by the first front lens. Therefore, the disclosed architecture provides a superior mechanism to gain good images with reduced size and weight as well as a smaller number of total lenses required for getting best images.

The metalens 22 and metalens 32 both may also be achromatic as introduced with the pioneering works such as by KHORASANINEJAD in U.S. Pat. No. 10,408,416 B2. However, the gain from achromatic metalenses is usually offset by their other nuisances.

Depending on the design goal, either of the metalens 22 and metalens 32 may be optimized to produce a zero optical power, meaning it would not be effectively converging or diverging the entire incident light, but only used to correct the phase. Such methods are already disclosed in the art such as by TAYLOR in U.S. Pat. No. 11,818,452 B2.

There are other disclosures provided in the art for the use of metalenses along with other lenses, such as LIU in WO 2022051971 A1, where a metalens is used in the front of the system combined with many other conventional lenses.

Compared to prior art, the present disclosure teaches the use of only three optical elements to be mandatory and sufficient for the purpose of high-quality imaging in a practical device, with the first element being a conventional lens, followed by two metalenses. The best mode for optical power of the optical elements is +−+. In addition, the adaptive phase wrapping disclosed in this document along with the Zernike approach for the phase calculations are unique to the disclosed architecture presented here which provide much reduced noise and high image quality. Such a design provides unique advantages over conventional lenses such as size, weight and length. In addition, such a design provides unique advantages over other metalens systems due to the specially designed order of elements which minimizes the zero-order noise present in metalens systems. The zero-order noise shows itself as a semi-DC background noise in the final image and causes image degradation, reduced image contrast and limited modulation transfer function. The disclosure here solves the current problem with metalens systems by removing the zero-order noise using the first element being a conventional lens which also adds mechanical strength to the entire system.

The choice of materials for the front lens could include any of the known materials in the art for the imaging band of interest. For example, for the band of thermal imaging a list including Germanium, Silicon, ZnSe, ZnS, and Chalcogenides would work. Similar materials would also be used for the metalenses, with more favorable choices being Silicon and Germanium.

The disclosed imaging system can also provide a variable effective focal length as is usual in the typical optical systems. For this purpose, the optimization of phase profiles 24 and 34 will need to be done over the entire range of focal lengths of interest, or over at least three focal lengths representing the desired range properly. DLS optimization is a preferred optimization algorithm to obtain the A and B coefficients of each metalens.

The current disclosure also sets forth a methodology for improved manufacturing of the metalenses based on adaptive phase wrapping. The method suggested in the present disclosure is to ensure each phase wrapping is represented by at least three phase elements. In this way, the phase wrapping must go beyond 2-pi to 4-pi, 6-pi or more as needed. The phase wrapping may also not be fixed to a particular wrapping size and thus be adapted from band to band just to ensure the minimum number of meta-cells could fit in the band.

Figure 3:
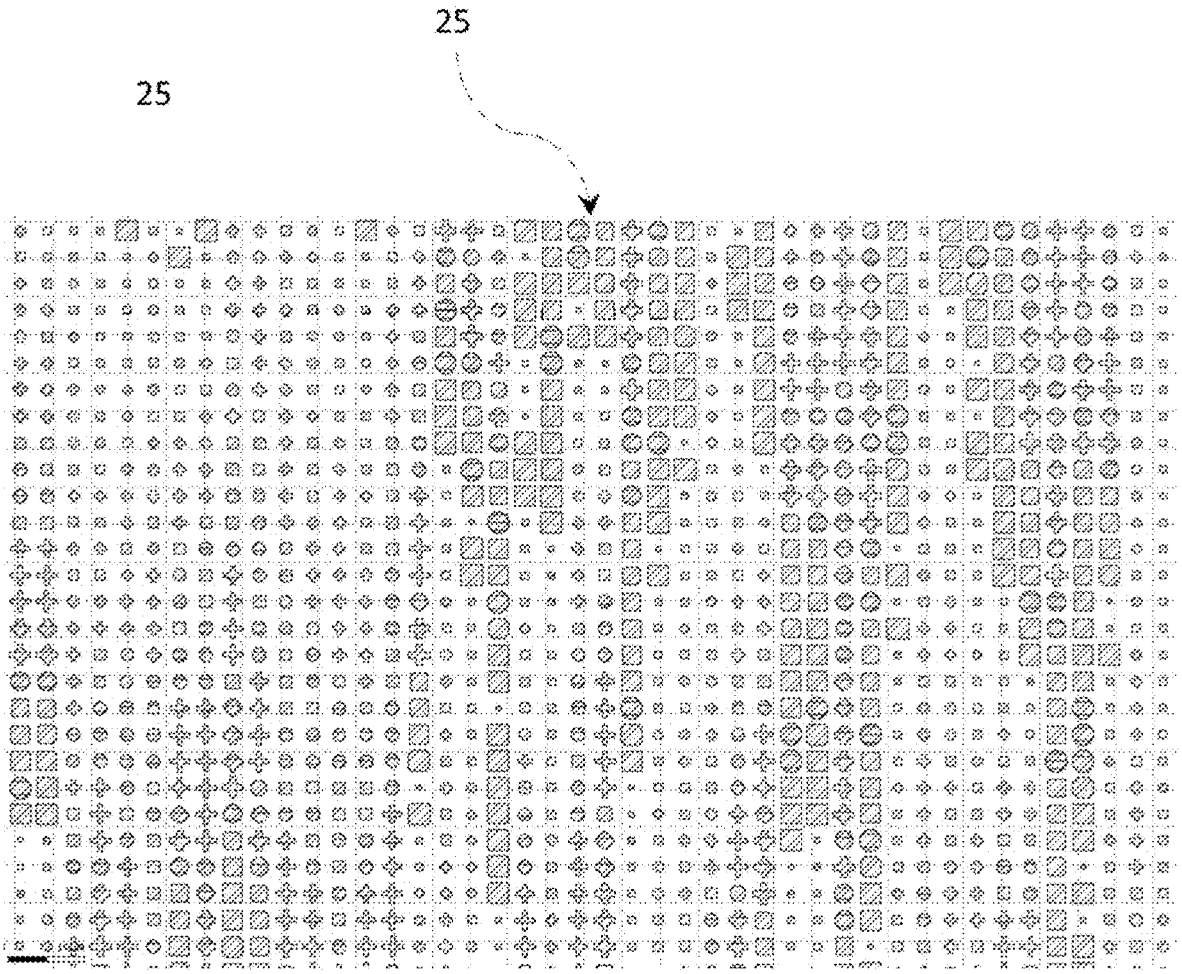
FIG. 3 is substantially a portion of the metalens design for ML1 which produces required phase for aberration correction and high-quality imaging.

FIG. 3 shows a portion of the metalens 20 as a GDS file ready for manufacturing stage. The manufacturing may be performed by using Si or Ge as the material for the sub-wavelength structures.

The described embodiment offers an imaging lens with reduced number of elements down to only three elements with reduced size and weight for aerial and space applications where the weight is of critical importance. In addition, for certain applications in aerial and space imaging which require the use of LWIR, the elements 20 and 30 can theoretically provide any phase profile needed for dispersion engineering as well, addressing the problem with the limited range of materials available for making lenses.

In another embodiment of the current disclosure, element 20 has zero optical power such that it only corrects the aberrations caused from 10, and element 30 has a negative optical power to produce a magnified image as in a telephoto lens.

In another embodiment of the current disclosure, element 20 has negative optical power to produce a magnified image from 10, and then 30 may correct for aberrations and proper focusing of the magnified image.

In another embodiment of the current disclosure, element 20 has negative optical power to produce a magnified image from 10 and at the same time 20 corrects for the aberrations, then 30 may provide proper focusing of the magnified image.

In one embodiment of the current disclosure, the elements 20 and 30 function as negative lenses, which combined with 10, introduce a telephoto lens.

In another embodiment of the current disclosure, element 20 has a negative optical chromatic dispersion and 30 has a positive optical chromatic dispersion such that the total chromatic dispersion from 10, 20 and 30 is minimized close to zero.

In another embodiment of the current disclosure, element 20 has a positive optical chromatic dispersion and 30 has a negative optical chromatic dispersion such that the total dispersion chromatic from 10, 20 and 30 is minimized close to zero.

In another embodiment of the current disclosure, the elements 20 and 30 may also be optimized to provide zoom functionality when they are allowed to translate along their common axis of symmetry.

In another embodiment of the current disclosure, the elements 20 and 30 may also be optimized to provide zoom functionality when they are allowed to rotate respectively about their common axis of symmetry.

In another embodiment of the current disclosure, the elements 20 and 30 may also be optimized to provide zoom functionality based on polarization sensitive meta-cells.

It is to be understood that a person having ordinary skill in the art may infer other modified version of the current embodiments in order to meet the specifications set forth in other regulations. Although the description above contains many specifications, these should not be construed as limiting the scope of the disclosure but as merely providing illustrations of some of embodiments of this disclosure. Thus, the scope of the disclosure should be determined by the appended claims and their legal equivalents.

What is claimed is:

1. An imaging lens system, comprising:

a first optical element comprising a thickness of a first optical material enclosed by a first diameter, a first refractive surface, and a second refractive surface, wherein the first optical element defines an axis of radial symmetry, the axis passes through center of the first optical element and center of both the first refractive surface and the second refractive surface, wherein the first optical element defines an opening to receive a light incoming to the imaging lens system, and wherein the first optical element substantially redirects the light along the axis;

a second optical element centered on the axis, placed at a first distance to said first optical element to receive the light redirected by said first optical element, wherein said second optical element comprises a first metalens having a second diameter and a first phase profile, said first phase profile is substantially symmetric about the axis and is extended to the second diameter, said first phase profile is partially dependent on optical properties of the first optical element and is described using Zernike polynomials, the first metalens comprises a first plurality of subwavelength phase elements arranged to produce the first phase profile symmetric about the axis, wherein the phase elements comprise cross-sections of a second optical material extending to a first height along the axis; and a third optical element centered on the axis, placed at a second distance to said second optical element to receive the light passing through said second optical element, wherein said third optical element comprises a second metalens having a third diameter and a second phase profile, said second phase profile is spatially symmetric about the axis and is extended to the third diameter, said second phase profile is partially dependent on optical properties of the first optical element and the second optical element, and is described using Zernike polynomials, the second metalens comprises a second plurality of subwavelength phase elements arranged to produce the second phase profile symmetric about the axis, wherein the phase elements of the second metalens comprise cross-sections of a third optical material extending to a second height along the axis;

wherein said imaging lens system is configured to form an image using the light incoming to said opening at a third distance from the third optical element, wherein said imaging lens system provides an effective focal length based on collective interactions of the light with the first optical element, the second optical element, and the third optical element.

2. The imaging lens system of claim 1, wherein the first phase profile and the second phase profile are configured to be phase wrapped based on an adaptive phase wrapping, wherein each of the first phase profile and the second phase profile is produced by a number of phase elements across its length, and the adaptive phase wrapping includes at least three different phase elements within each wrapping.

3. The imaging lens system of claim 2, wherein the first phase profile is configured to produce a negative optical power, and the second phase profile is configured to produce a positive optical power.

4. The imaging lens system of claim 3, wherein the second optical element and the third optical element have substantially opposite chromatic dispersions, and a sum of chromatic dispersions for the first, the second and the third optical elements substantially approaches zero.

5. The imaging system of claim 3, wherein the second optical element is substantially achromatic, and the third optical element is substantially achromatic, and a sum of chromatic dispersions from the first optical element, the second optical element and the third optical element approaches zero.

6. The imaging system of claim 5, wherein the first distance and the second distance are adjustable to allow a change in the effective focal length.

7. The imaging system of claim 5, wherein the second optical element and the third optical element are configured to be rotated individually about the axis to allow adjustment of the effective focal length.

8. The imaging lens system of claim 2, wherein the second optical element and the third optical element have substantially opposite chromatic dispersions, and a sum of chromatic dispersions for the first, the second and the third optical elements substantially approaches zero.

9. The imaging system of claim 2, wherein the second optical element is substantially achromatic, and the third optical element is substantially achromatic, and a sum of chromatic dispersions from the first optical element, the second optical element and the third optical element approaches zero.

10. The imaging system of claim 1, wherein the second optical element and the third optical element have substantially opposite chromatic dispersions, and a sum of chromatic dispersions for the first, the second and the third optical elements approaches zero.

11. The imaging system of claim 1, wherein the first phase profile is configured to produce zero optical power, and the second phase profile is configured to produce a positive optical power.

12. The imaging system of claim 1, wherein the first phase profile configured to produce zero optical power, and the second phase profile configured to produce a negative optical power.

13. The imaging system of claim 1, wherein the first phase profile configured to produce a negative optical power, and the second phase profile configured to produce a negative optical power.

14. The imaging system of claim 1, wherein the first phase profile configured to produce a negative optical power, and the second phase profile configured to produce a positive optical power.

15. The imaging system of claim 1, wherein the first phase profile configured to produce a negative optical power, and the second phase profile configured to produce zero optical power.

16. The imaging system of claim 1, wherein the first optical element is an achromatic lens.

17. The imaging system of claim 1, wherein the second optical element is substantially achromatic, and the third optical element is substantially achromatic, and a sum of chromatic dispersions from the first optical element, the second optical element and the third optical element approaches zero.

18. The imaging system of claim 1, wherein the second optical material is Germanium or Silicon, and the third optical material is Germanium or Silicon.

19. The imaging system of claim 1, wherein the first distance and the second distance are adjustable to allow a change in the effective focal length.

20. The imaging system of claim 1, wherein a diameter of the first metalens configured to receive light thereon is in an order of one inch.

* * * * *